(12) United States Patent
Fuccello et al.

(10) Patent No.: US 8,670,421 B2
(45) Date of Patent: Mar. 11, 2014

(54) SYSTEM AND METHOD FOR COHESIVE RADIO OPERATION

(75) Inventors: James R. Fuccello, Patchogue, NY (US); Mark Orlassino, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1958 days.

(21) Appl. No.: 11/001,436

(22) Filed: Nov. 30, 2004

(65) Prior Publication Data
US 2006/0114864 A1    Jun. 1, 2006

(51) Int. Cl.
*H04W 4/00*    (2009.01)

(52) U.S. Cl.
USPC .......... 370/338; 370/465; 370/466; 370/335; 370/227; 455/437; 455/509; 455/450; 455/453; 455/41.2; 455/413

(58) Field of Classification Search
USPC .......... 370/338, 465, 466, 335, 277; 455/437, 455/509, 450–453, 41.2–41.3
See application file for complete search history.

(56) References Cited

U.S. PATENT DOCUMENTS

| | | | |
|---|---|---|---|
| 6,006,099 A | 12/1999 | Rondeau et al. | |
| 6,326,926 B1 | 12/2001 | Shoobridge et al. | |
| 6,590,928 B1 * | 7/2003 | Haartsen | 375/134 |
| 6,895,255 B1 * | 5/2005 | Bridgelall | 455/552.1 |
| 7,039,031 B1 | 5/2006 | Joeressen | |
| 7,039,358 B1 | 5/2006 | Shellhammer et al. | |
| 7,046,649 B2 * | 5/2006 | Awater et al. | 370/338 |
| 7,099,680 B2 | 8/2006 | Roderique | |
| 2001/0017853 A1 * | 8/2001 | Kikuchi et al. | 370/335 |
| 2002/0061031 A1 | 5/2002 | Sugar et al. | |
| 2002/0163895 A1 * | 11/2002 | Haller et al. | 370/335 |
| 2003/0045235 A1 * | 3/2003 | Mooney et al. | 455/41 |
| 2003/0206531 A1 * | 11/2003 | Shpak | 370/320 |
| 2004/0022210 A1 | 2/2004 | Frank et al. | |
| 2004/0048577 A1 * | 3/2004 | Godfrey et al. | 455/67.11 |
| 2004/0176122 A1 * | 9/2004 | Godfrey | 455/509 |
| 2005/0025104 A1 | 2/2005 | Fischer et al. | |
| 2005/0059347 A1 | 3/2005 | Haartsen | |
| 2006/0003802 A1 * | 1/2006 | Sinai | 455/553.1 |
| 2006/0084383 A1 * | 4/2006 | Ibrahim et al. | 455/41.2 |
| 2007/0135162 A1 * | 6/2007 | Banerjea et al. | 455/556.1 |

FOREIGN PATENT DOCUMENTS

WO    2006060245    6/2006

OTHER PUBLICATIONS

Written Opinion of the International Searching Authority and International Search Report dated Nov. 9, 2006 corresponding to International Appl. No. PCT/US05/42378, a foreign counterpart.
Canada Office Action mailed on Jul. 7, 2011 for Application No. 2,588,084.
Supplementary European Search Report mailed on Sep. 5, 2011 for Application No. 05849373.5-1249.
International Preliminary Report on Patentability mailed on Jun. 5, 2007 for International Application No. PCT/US05/42378.

* cited by examiner

*Primary Examiner* — Nimesh Patel

(57) ABSTRACT

Described is a system which includes a first radio transceiver operating in accordance with a first communication protocol and a second radio transceiver operating in accordance with a second communication protocol. The first radio transceiver transmits a first signal to the second transceiver, the first signal including data related to operation of the first radio transceiver. The second radio transceiver adjusts operation as a function of the data.

13 Claims, 3 Drawing Sheets

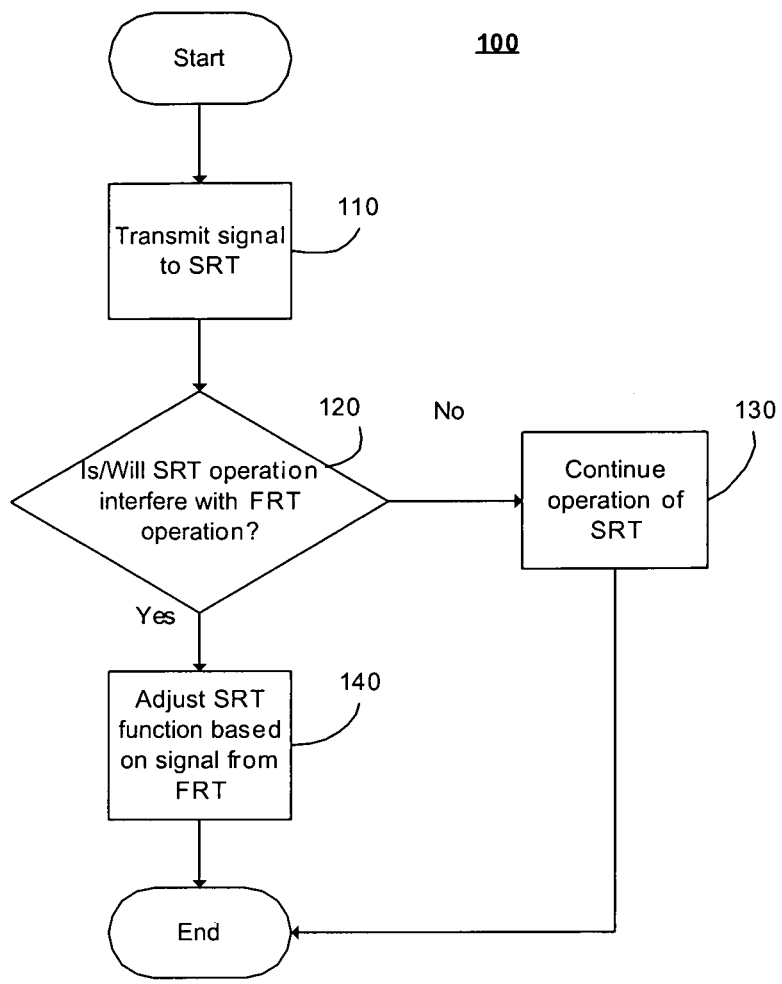

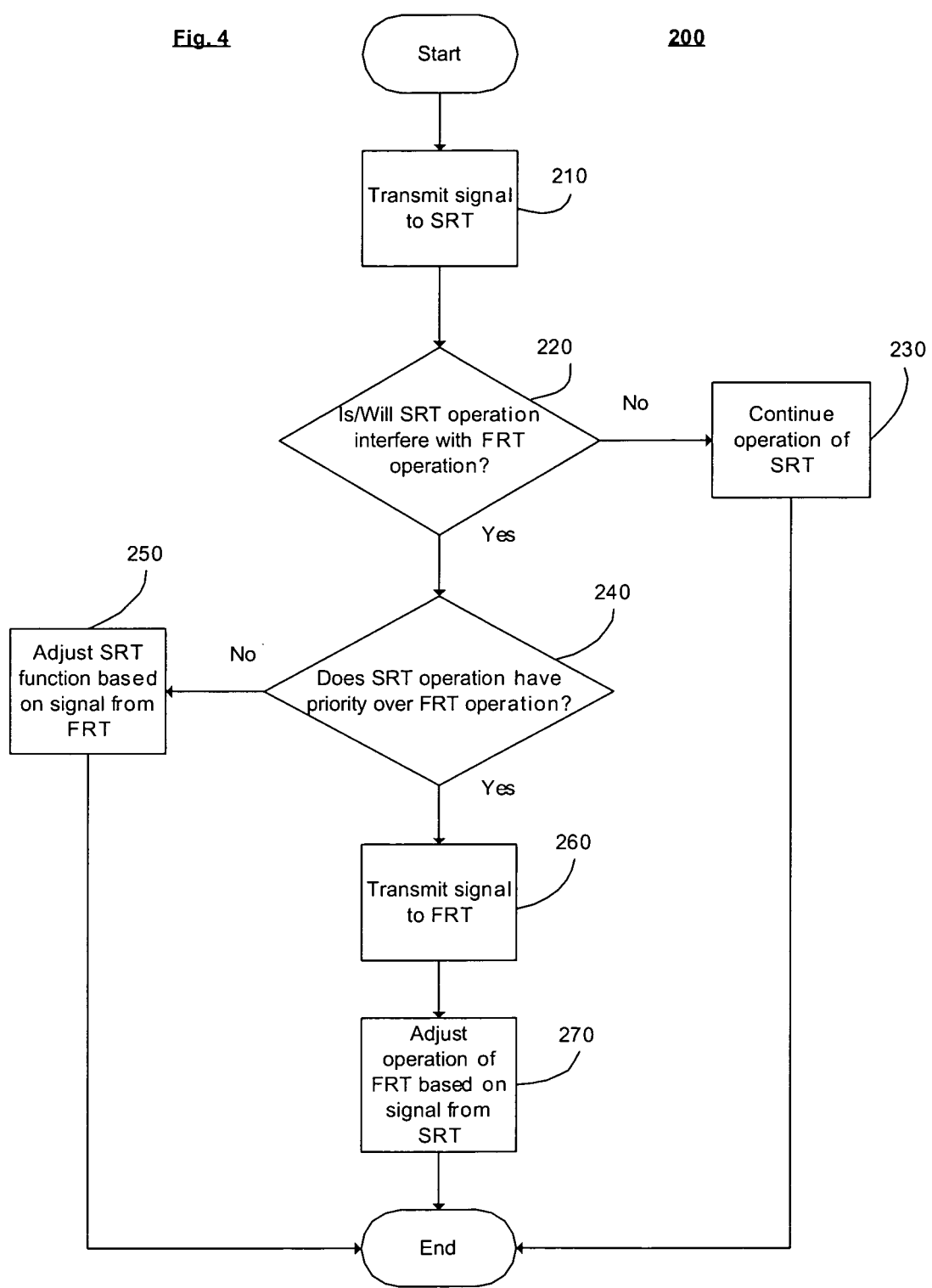

US 8,670,421 B2

SYSTEM AND METHOD FOR COHESIVE RADIO OPERATION

BACKGROUND

A conventional system may utilize a radio transceiver that operates according to a conventional wireless communication protocol (e.g., the IEEE 802.11 standard). The system may include a plurality of wireless devices which communicate with a central computer using one or more access points. As defined in the 802.11 standard, these communications may utilize the 2.4 GHz frequency band. The system may include a further radio transceiver that operates according to a further wireless communication protocol (e.g., Bluetooth®). Bluetooth operates on the same frequency band as the 802.11 standard, and is designed for short-range wireless communications using a low power level.

Each of the radio transceivers has its own operating system that controls the parameters of its operation (e.g., status, security, settings). In particular, these operating systems are independent of each other. For example, if the 802.11 radio transceiver modifies its parameters, the Bluetooth radio transceiver does not adjust its operations based on the modified parameters of the 802.11 transceiver. Also, operation of both transceivers on the same frequency band may lead to interference in transmission/reception of a signal, degradation of the signal and/or reduced functionality of each of the transceivers. For example, performing a function with the 802.11 transceiver may impact or limit the functionality of the Bluetooth transceiver. As such, a user may find it difficult to manage the transmission/reception of signals by the transceivers due to the interference.

Also problematic in multi-transceiver and multi-protocol systems is that the user is not presented with or notified about simultaneous operations that may be performed on the transceivers. Furthermore, each transceiver may have a separate interface, through which the user must coordinate use of one transceiver while monitoring or adjusting performance of another transceiver.

SUMMARY OF THE INVENTION

A system which includes a first radio transceiver operating in accordance with a first communication protocol and a second radio transceiver operating in accordance with a second communication protocol. The first radio transceiver transmits a first signal to the second transceiver, the first signal including data related to operation of the first radio transceiver. The second radio transceiver adjusts operation as a function of the data.

In addition, a method for transmitting a signal containing data from a first radio transceiver to a second radio transceiver, determining whether operation of the second radio transceiver will interfere with operation of the first radio transceiver based on the data in the signal and adjusting operation of the second radio transceiver as a function of the data.

Furthermore, a radio transceiver operating in accordance with a first communication protocol which includes a receiver to receive a first signal from a further radio transceiver operating in accordance with a second communication protocol, the first signal including data related to operation of the further transceiver and an operation element to adjust operation of the radio transceiver as a function of the data.

BRIEF DESCRIPTION OF THE DRAWINGS

FIG. 3 shows an exemplary embodiment of a method employing the cohesive radio system of the present invention.

FIG. 4 shows another exemplary embodiment of a method employing the cohesive radio system of the present invention.

DETAILED DESCRIPTION

Figure 1:
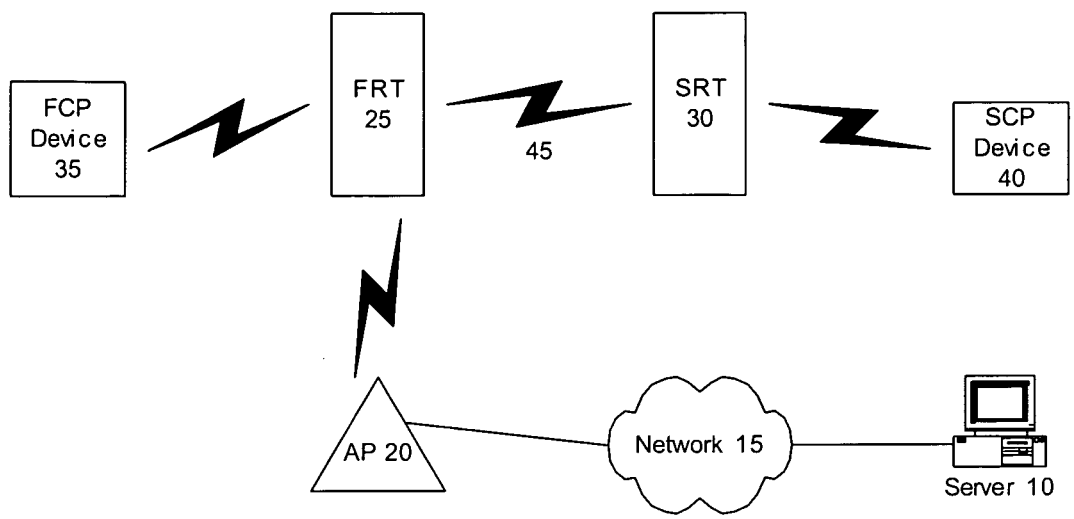
FIG. 1 shows an exemplary embodiment of a cohesive radio system according to the present invention.

FIG. 1 shows an exemplary embodiment of a cohesive radio system 5 according to the present invention. The system 5 may include a server 10 connected to a communication network 15. The wired communication network 15 is further connected to an access point ("AP") 20. As would be understood by those skilled in the art, there may be any number of APs, and the network 15 may include any number and type of components (e.g., telephones, fax machines, etc.).

The AP 20 allows for the transmission and reception of wireless signals according to a first communication protocol ("FCP") (e.g., the 802.11b protocol) using a particular frequency band (e.g., the 2.4 GHz band). As would be understood by those skilled in the art, the AP 20 may include an element (e.g., antenna) that enhances and/or facilitates the ability of the AP 20 to send and receive the wireless signals.

The system 5 further includes a first radio transceiver ("FRT") 25 and a second radio transceiver ("SRT") 30. According to the present invention, the FRT 25 and the SRT 30 may be housed in a singular computing arrangement (e.g., personal computer, laptop, cell phone, PDA, hand-held computer, etc.) or separate computing arrangements (e.g., a distributed computing environment). The FRT 25 and/or the SRT 30 may have corresponding user interface(s). As would be understood by those skilled in the art, the user interface may include, for example, a set of controls, an operation display, a connection for wired or wireless attachment of further devices, an antenna, etc.

The FRT 25 communicates using the FCP, allowing it to send and receive signals via the AP 20 and a FCP device 35 (e.g., personal computer, laptop, cell phone, PDA, hand-held computer, etc.) utilizing the FCP. As would be understood by those skilled in the art, the FRT 25 may include an element (e.g., antenna) (not shown) that enhances and/or facilitates the ability to send and receive wireless signals.

The SRT 30 may operate in accordance with a second communication protocol ("SCP") (e.g., Bluetooth®), which uses the same frequency band as the FCP. The SRT 30 may communicate with a SCP device 40 which operates utilizing the SCP. For example, the SCP device 40 may be a slave device (e.g., a scanner, a printer, a PDA, a personal data managing device, a PC card, a headset, etc.). As a slave device, the SCP device 40 can send signals to and receive signals from the SRT 30 utilizing the SCP.

In one embodiment of the present invention, a user of the system 5 may select a particular channel for operation of the FRT 25. The FRT 25 may operate on one of several communication channels on the frequency band. As is known by those skilled in the art, the frequency band utilized by the 802.11 network has fourteen channels available for use. However, some countries restrict the availability of the channels. For example, in the United States, only channels 1-11 are available for use; on the other hand, channels 1-13 are available in most of Europe. In Japan, only channel 14 is available. The selected channel will allow communication between devices that operate using the FCP (e.g., the FRT 25 and the FCP device 35). As would be understood by those skilled in the art, the selection of the channel for operation of the FRT 25 may alternatively be performed by a program or a subroutine. For example, a channel with an active access point may be automatically selected.

After the channel has been selected, the FRT 25 sends a signal 45 to the SRT 30. The signal 45 may include data relating to the selected channel. In further embodiments, the data may relate to operation or intended operation of the FRT 25. For example, the data may reveal operating parameters, such as a task being performed or intended to be performed by the FRT 25, a setting change of the FRT 25 and/or a status change of the FRT 25. As understood by those skilled in the art, transmission and reception of the signal 45 may be accomplished with similar software interfaces provided on the FRT 25 and the SRT 30 using, for example, a common application program interface ("API"), or, alternatively, using a hardware interface, such as a common processor when the FRT 25 and the SRT 30 are housed within the same computing arrangement.

Upon receipt of the signal 45, the SRT 30 may adjust its operation using an operation element as a function of the data contained in the signal 45. For example, the SRT 30 may receive data regarding the channel that the FRT 25 is currently using or intends to use. The SRT 30 operating according to the SCP, may modify its operation to avoid the channel that the FRT 25 is using or intends to use. In this manner, the SRT 30 may adjust its operation a priori, before interfering with operation of the FRT 25 on the channel.

In contrast to the prior art, the present invention provides a priori knowledge to the SRT 30 of the channel that is being used by the FRT 25. The signal 45 from the FRT 25 may indicate to the SRT 30 which channel the FRT 25 is using. As a result, the SRT 30 may modify its bit mask to avoid transmitting data on the channel. In effect, the SRT 30 does not need to "learn" by having the data packets collide with activity on the channel used by the 802.11 device.

In a further exemplary embodiment of the present invention, the signal 45 may be transmitted from the SRT 30 to the FRT 25. For example, the signal 45 may contain data regarding the bit mask of the SRT 30. In this manner, the FRT 25 may refrain from selecting one of the channels being used by the SRT 30.

Figure 2:
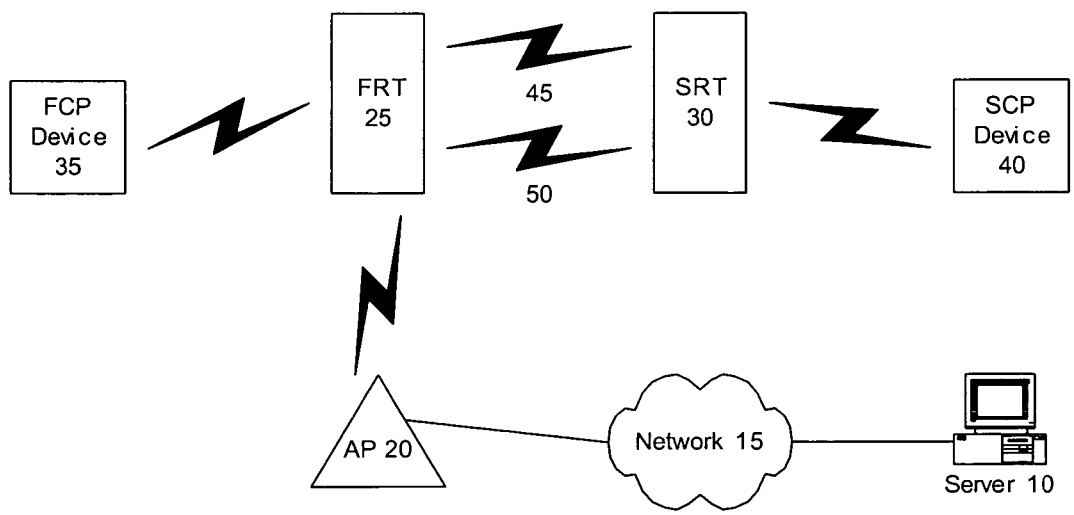
FIG. 2 shows another exemplary embodiment of a cohesive radio system according to the present invention.

FIG. 2 shows a further exemplary embodiment of the cohesive radio system 5. This further embodiment also includes the server 10 connected to the communication network 15, which is further connected to the AP 20. The AP 20 communicates wireless signals to the FRT 25 and/or the SRT 30. The user may select the channel for operation of the FRT 25. The FRT 25 then sends the signal 45 to the SRT 30 with data regarding the choice of the channel. In this embodiment, the SRT 30 may respond with a further signal 50 which includes response data to the data in the signal 45 originally sent by the FRT 25. For example, the SRT 30 may be using the channel for an important purpose, which cannot be interrupted. The further signal 50 to the FRT 25 may include data that communicates to the FRT 25 that the use of the channel by the SRT 30 is critical and may not be interrupted or degraded in any way. The FRT 25 may then select a different channel based on the data in the further signal 50.

An exemplary method 100 according to the present invention is shown in FIG. 3. At step 110, the FRT 25 transmits the signal 45 to the SRT 30. As described above, the signal 45 may include data relating to operation of the FRT 25. In step 120, the SRT 30 determines, based on the data in the signal 45, whether operation of the SRT 30 is interfering or will interfere with operation of the FRT 25. For example, if the data in the signal 45 represents that the FRT 25 will be using channel two for operation, then the SRT 30 may want to cease communication on channel two.

If operation of the SRT 30 is not interfering or will not interfere with operation of the FRT 25, then the SRT 30 may continue its operation, as shown in step 130. However, if operation of the SRT 30 is interfering or will interfere with operation of the FRT 25, the SRT 30 may adjust its function based on the data in the signal 45 from the FRT 25, as shown in step 140. With respect to the example noted above, the SRT 30 may cease communication on channel two. If the SRT 30 is using Bluetooth as the SCP, the ceasing of communications on channel two may be represented by alteration of the bit mask of the SRT 30. For example, entering a zero value in the bit mask may indicate that channel two is "bad" and should not be used (i.e., hopped to in AFH).

FIG. 4 shows a further exemplary embodiment of a method 200 according to the present invention. In step 210, the FRT 25 transmits the signal 45 to the SRT 30. As described above, the signal 45 may include data relating to operation of the FRT 25. In step 220, the SRT 30 determines whether its operation is interfering or will interfere with operation of the FRT 25. If operation of the SRT 30 is not and will not interfere with operation of the FRT 25, the method 200 proceeds to step 230, wherein the SRT 30 continues with its present and/or intended operation.

If the SRT 30 determines that its operation is interfering or will interfere with operation of the FRT 30, the method 200 proceeds to step 240, wherein the SRT 30 determines whether its present or intended operation has priority over the operation of the FRT 25. As seen in step 250, if the SRT 30 does not have priority over the FRT 25, the SRT 30 adjusts its operation based on the signal 45 from the FRT 25. However, as seen in step 260, if the SRT 30 has priority over the FRT 25, and the SRT 30 transmits the further signal 50 to the FRT 25, indicating that the SRT 30 has priority. In step 270, the FRT 25 receives the further signal 50 and adjusts its operation based thereon. In this manner, the data in the further signal 50 may represent that the operation of the SRT 30 is critical and should not be interrupted and/or degraded. In response, the FRT 25 may avoid operations (e.g., using the channels noted in the further signal 50) that will inhibit operation of the SRT 30.

According to the present invention, the signals 45, 50 may include data that represents the operation of the FRT 25 and SRT 30, respectively. In response to the signals 45, 50, the FRT 25 or the SRT 30 may make a decision regarding its own operation, thereby optimizing the performance of the system 5 by allowing the FRT 25 and the SRT 30 to make informed decisions about their operation. However, in a further embodiment, the signals 45, 50 may include a command. For example, the FRT 25 may be conducting a critical operation. In this manner, the signal 45 from the FRT 25 to the SRT 30 includes the command that instructs the SRT 30 to refrain from using channel two. In one example, the SRT 30 must obey the command and refrain from using channel two until further instructed by the FRT 25, until a predetermined time has been reached (e.g., a counter) or until a request by the SRT 30 to use channel two has been granted by the FRT 25. In a second example, the FRT 25 may alter the operation of the SRT 30 by, for example, blocking the SRT 30 from accessing channel two (e.g., by altering the bit mask of the SRT 30).

The system 5 of the present invention may be further applied to enhance security of data. In this manner, the data that requires the highest security in its transmission/reception may be given a priority. For example, the SRT 30 may be set to a "wide-open setting." As understood by those skilled in the art, any transmission from the SRT 30 is discoverable by all devices within transmission/reception range of the SRT 30. Thus, if the FRT 25 is performing or going to perform a secure operation, the signal 45 may contain data that represents to the SRT 30 that it should enhance its security (e.g., closed-to-all setting).

A further exemplary embodiment of the system 5 of the present invention is for communication using voice-over internet protocol ("VoIP"). For example, the FRT 25 may be using VoIP, thereby requiring uninterrupted or non-degradable performance to maintain a suitable audio quality. Thus, the signal 45 from the FRT 25 to the SRT 30 may inform the SRT 30 to prevent an audio profile connection which would interfere with and degrade the audio quality if allowed to connect.

A further exemplary embodiment of the system 5 is to improve the user experience with the FRT 25 and the SRT 30. For example, as noted above, each radio transceiver may have its own user interface. As such, the user may be required to adjust the settings of the SRT 30 after making a change to the settings of the FRT 25. However, the system 5 of the present invention enables automatic adjustment of the SRT 30 after the user makes a change to the FRT 25.

As would be understood by those skilled in the art, the present invention may further be applied to communicate information regarding radio stack status, coexistence (e.g., AFH), debugging consoles, mesh networks, mobile satellite service, wireless local area networks, wide area networks and wireless personal area networks.

The present invention has been described with the reference to the radio transceivers 25, 30, the communications protocols FCP, SCP, and the signals 45, 50. One skilled in the art would understand that the present invention may also be successfully implemented. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A system, comprising:
    a housing;
    a first radio transceiver positioned in the housing and operated in accordance with a first communication protocol; and
    a second radio transceiver positioned in the housing and operated in accordance with a second communication protocol;
    wherein the first radio transceiver is operated to transmit a first signal to the second radio transceiver, the first signal including data indicating a particular channel selected for operation of the first radio transceiver;
    wherein the second radio transceiver is operated to transmit a second signal to the first radio transceiver and then is operated to avoid operating on the particular channel while the first radio transceiver operates on the particular channel.

2. The system according to claim 1, wherein the first communication protocol is one of an 802.11 standard and a Bluetooth standard.

3. The system according to claim 1, wherein the second communication protocol is one of an 802.11 standard and a Bluetooth standard.

4. The system according to claim 1, wherein the second signal includes data relating to operation of the second radio transceiver.

5. The system according to claim 4, wherein the first radio transceiver adjusts operation as a function of the data in the second signal.

6. The system according to claim 4, wherein the data in the second signal relates to a priority of operation of the second radio transceiver.

7. The system according to claim 4, wherein the data in the second signal comprises a bitmask of the second radio transceiver.

8. The system according to claim 7, wherein the bitmask is one of an IEEE 802.11b channel mask and a Bluetooth AFH channel mask.

9. A method, comprising:
    transmitting a signal containing data from a first radio transceiver to a second radio transceiver;
    determining whether operation of the second radio transceiver will interfere with operation of the first radio transceiver based on the data in the signal; and
    adjusting operation of the second radio transceiver as a function of the data.

10. The method according to claim 9, wherein the data in the second signal relates to a priority of the second radio transceiver.

11. The method according to claim 9, wherein the data in the second signal comprises a bitmask of the second radio transceiver.

12. The method according to claim 9, wherein the first communication protocol is one of an 802.11 standard and a Bluetooth standard.

13. The method according to claim 9, wherein the second communication protocol is one of an 802.11 standard and a Bluetooth standard.

* * * * *

UNITED STATES PATENT AND TRADEMARK OFFICE
CERTIFICATE OF CORRECTION

| | |
|---|---|
| PATENT NO. | : 8,670,421 B2 |
| APPLICATION NO. | : 11/001436 |
| DATED | : March 11, 2014 |
| INVENTOR(S) | : Fuccello et al. |

It is certified that error appears in the above-identified patent and that said Letters Patent is hereby corrected as shown below:

In the claims

Column 6, line 30-36, which reads,

"transmitting a signal containing data from a first radio tranceiver to a second radio transceiver;
determining whether operation of the second radio transceiver will interfere with operation of the first radio transceiver based on the data in the signal; and
adjusting operation of the second radio transceiver as a function of the data."

should read,

--transmitting a signal from a first radio transceiver operating in accordance with a first communication protocol to a second radio transceiver operating in accordance with a second communication protocol, the signal containing data indicating a particular channel selected for operation of the first radio transceiver, the first radio transceiver and the second radio transceiver positioned in a housing;
determining whether operation of the second radio transceiver will interfere with operation for the first radio transceiver based on the data in the signal;
transmitting a second signal to the first radio transceiver, the second signal containing second data;
adjusting operation of the first radio transceiver as a function of the second data in the second signal; and
adjusting operation of the second radio transceiver by avoiding operating on the particular channel while the first radio transceiver operates on the particular channel.--

Signed and Sealed this
Twenty-second Day of March, 2016

Michelle K. Lee
*Director of the United States Patent and Trademark Office*